(12) United States Patent
Bäcklund

(10) Patent No.: US 6,250,332 B1
(45) Date of Patent: Jun. 26, 2001

(54) DIAPHRAGM VALVE

(75) Inventor: Ingvar Bäcklund, Lidingö (SE)

(73) Assignee: Robovalve AB, Lidingö (SE)

( * ) Notice: Subject to any disclaimer, the term of this patent is extended or adjusted under 35 U.S.C. 154(b) by 0 days.

(21) Appl. No.: 09/402,194

(22) PCT Filed: Apr. 3, 1998

(86) PCT No.: PCT/SE98/00621

§ 371 Date: Oct. 1, 1999

§ 102(e) Date: Oct. 1, 1999

(87) PCT Pub. No.: WO98/45629

PCT Pub. Date: Oct. 15, 1998

(30) Foreign Application Priority Data

Apr. 4, 1997 (SE) .................................................. 9701242

(51) Int. Cl.⁷ .................................................. F17D 11/00
(52) U.S. Cl. .................................................. 137/597; 251/61.1
(58) Field of Search .............................. 137/597; 251/61.1

(56) References Cited

U.S. PATENT DOCUMENTS

| | | | |
|---|---|---|---|
| 5,277,224 | * | 1/1994 | Hutton et al. ........................ 137/597 |
| 5,295,662 | * | 3/1994 | Yamaji et al. ........................ 251/331 |
| 5,335,691 | * | 8/1994 | Kolenc ................................. 137/312 |
| 5,549,134 | * | 8/1996 | Browne et al. ....................... 137/606 |
| 5,762,314 | * | 6/1998 | Williams ............................... 251/25 |
| 5,906,223 | * | 5/1999 | Pinkham .............................. 137/597 |
| 6,082,398 | * | 7/2000 | Girard et al. ........................ 137/599 |
| 6,089,532 | * | 7/2000 | Rohloff et al. ...................... 251/61.4 |
| 6,112,767 | * | 9/2000 | Pinkham .............................. 137/597 |

FOREIGN PATENT DOCUMENTS

| | | |
|---|---|---|
| 0618389 | 10/1994 | (EP) . |
| 9500782 | 1/1995 | (WO) . |
| 9717558 | 5/1997 | (WO) . |

\* cited by examiner

*Primary Examiner*—A. Michael Chambers
*Assistant Examiner*—Thomas L. McShane

(57) ABSTRACT

A diaphragm valve including a valve housing having at least three ports and at least two valve chambers provided in the valve housing. Each valve chamber has at least one first space communicating with a respective one of the ports and a second space separated from the first space by a threshold. The second space of each valve chamber communicates only with the second space of others of the at least two valve chambers, such that communication between any two of the at least two ports can take place only by passing across two thresholds.

4 Claims, 4 Drawing Sheets

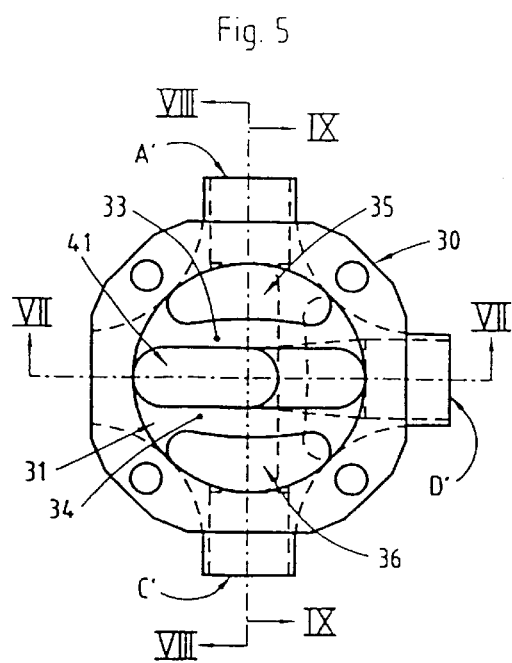
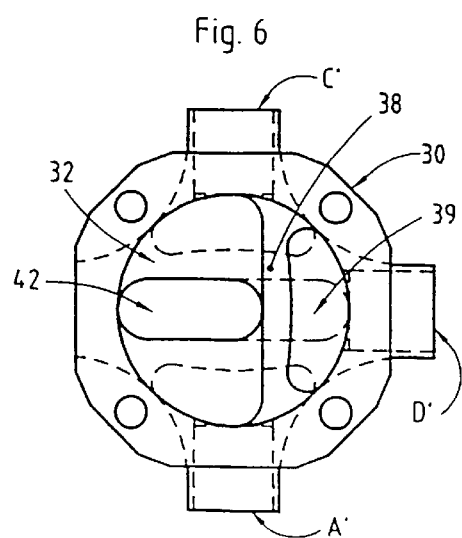
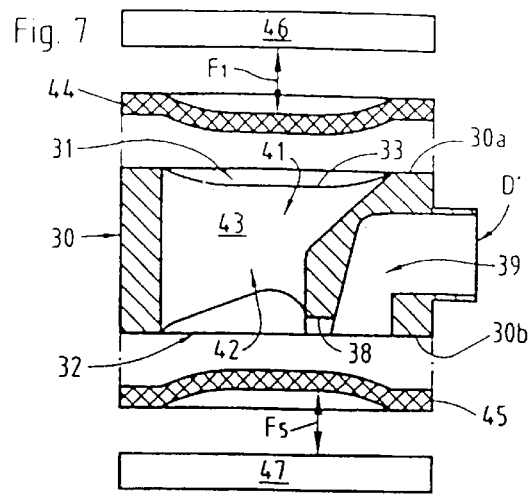
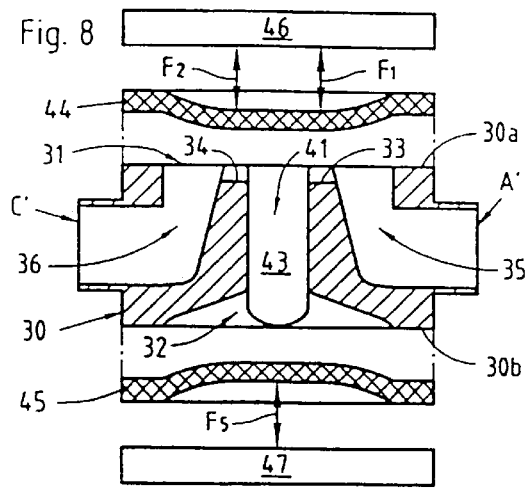
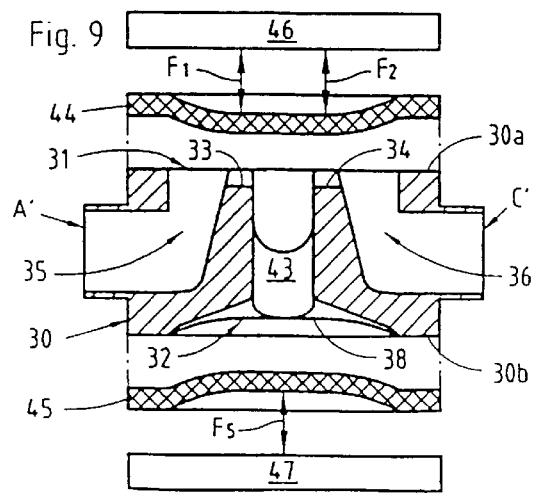

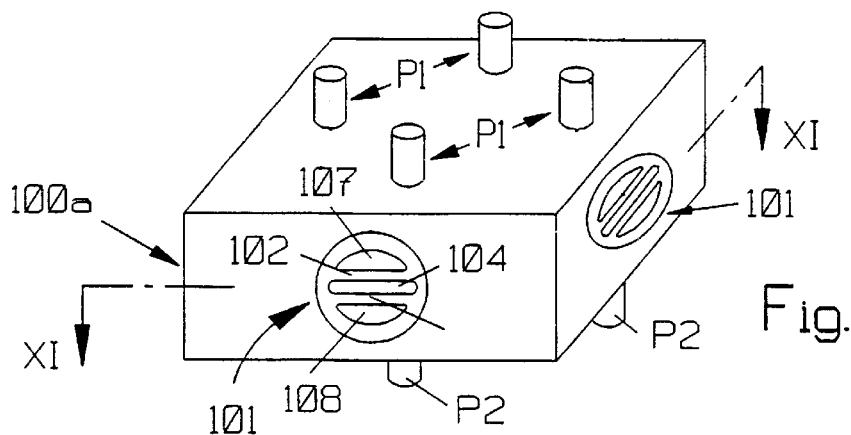
Fig. 10
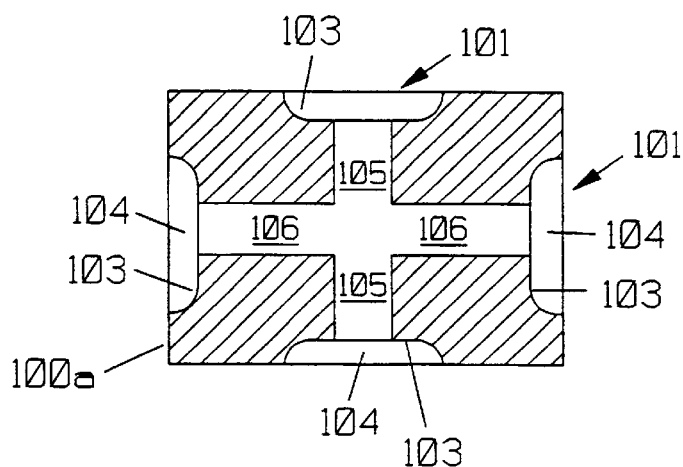
Fig. 11
Fig. 12
Fig. 13
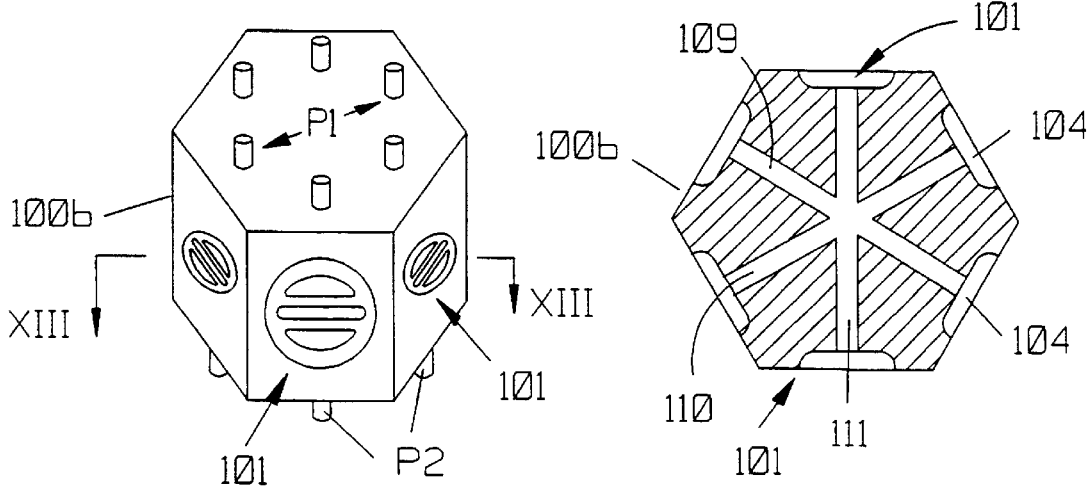

US 6,250,332 B1

DIAPHRAGM VALVE

This application is the national phase under 35 U.S.C. §371 of PCT International Application No. PCT/SE98/00621 which has an International filing date of Apr. 3, 1998 which designated the United States of America.

BACKGROUND OF THE INVENTION

1. Field of the Invention

The present invention concerns a diaphragm valve for controlling a flow of gaseous or liquid fluid and, particularly, to direct such flow from at least one port of the valve to at least one other port of the valve.

2. Related Art

WO 95/00782, by the present inventor, describes such a diaphragm valve including a valve housing having a substantially circular valve chamber, into which opens a central channel and on each side thereof a first side channel and a second side channel. Each side channel has an external connection for fluid and is separated from the central channel by means of a respective one of two substantially parallel valve seat means extending like chords across the valve chamber. Each valve seat means provides a substantially linear valve seat for an elastic diaphragm. The diaphragm is adapted to be brought into and away from sealing contact with at least one of the valve seat means. Two individually operable control means are adapted both to press a respective linear portion of the diapghragm against a respective valve seat, thereby to shut passage of fluid between the central channel and a respective side channel, and to positively raise a respective portion of the diaphragm off a respective one of the valve seat, thereby to open a flow passage between the central channel and the respective side channel.

This prior art three-way/three-port diaphragm valve proved to operate extremely well. There was, however, a desire to convert it to a 4-way/4-port valve, i.e., a valve for mixing three flows, or, to direct flow from one external connection (inlet port) to one or more of three other external connections (outlet ports).

That was accomplished by a first development of the valve as initially stated. This first development is described in WO 97/17558 by the same inventor. In the diaphragm valve according to the first development, the valve housing is provided with a second substantially circular valve chamber, into which opens a fourth channel having an external connection for fluid and which communicates with the central channel through an opening in the valve housing. A second elastic diaphragm is provided and is adapted to be brought into and away from sealing engagement with a third valve seat means provided in the second valve chamber. A third control means is arranged both to press the second diaphragm against the third valve seat means, thereby to shut passage of fluid between the fourth channel and the central channel, and to release the diaphragm from its engagement with the third valve seat means, thereby to open passage of fluid between the fourth channel and the central channel.

Also this valve has proven to satisfactory fulfil its objects.

Common to the two prior art valves mentioned is a central channel having direct communication with an associated port. Consequently, this port becomes involved also in fluid transfer between the remaining two ports in the valve according to WO 95/00782 and between any combination of two of the remaining three ports in the valve according to WO 97/17558.

SUMMARY OF THE INVENTION

It is an object of the present invention to provide a diaphragm valve allowing transfer of fluid between any combination of at least two of its ports without any other port being involved. In achieving this, the new diaphragm valve shall comply with the same extensive sanitary requirements as the prior one, it shall be simply and reliably operable and have relatively few movable parts.

In a diaphragm valve of the kinds described above, the valve seats can be characterized as thresholds or weirs between adjacent channels and associated ports. Communication between two ports is established by fluid passage across but one threshold.

To achieve the object of the present invention, it is proposed that the central channel be replaced by a central space having no direct communication with any port. Fluid passage from a port to the central space must take place across a threshold, and passage from the central space to any other port must take place across a further threshold. Thus, all flow across the valve has to pass the central space.

BRIEF DESCRIPTION OF THE DRAWINGS

Embodiments of present invention will now be more closely described, reference being made to the accompanying drawings, wherein

FIG. 5 is a top view of a valve housing of a second embodiment;

FIG. 6 is a bottom view of the valve housing accroding to FIG. 5;

FIG. 7 is a vertical central section taken along line VII—VII in FIG. 5;

FIG. 8 is a vertical central section taken along line VIII—VIII in FIG. 5;

FIG. 9 is a vertical central section taken along line IX—IX in FIG. 5;

FIG. 10 is a perspective view of a possible third embodiment of the present invention having one valve chamber in each of the four sides of a valve housing having a square cross section;

FIG. 11 is a section along line XI—XI of FIG. 10;

FIG. 12 is a perspective view of a possible forth embodiment of the present invention having one valve chamber in each of the six sides of a valve housing having the cross section of a regular hexagon;

FIG. 13 is a section along line XIII—XIII of FIG. 12;

Like the membrane valve described in WO 97/17558, the valves according to the first and second embodiments of the present invention described with reference to FIGS. 1–4 and FIGS. 5–9, respectively, include a valve housing having an upper and a lower valve chamber, each having valve seat means and an elastic diaphragm as well as an operating unit capable of controlling movements of the associated diaphragm so as to bring it into and away from sealing contact with the respective valve seat means.

Since is is preferred to utilize operating units as described in WO 97/17558 with the embodiments of the present invention, they will not be described herein in detail.

The first embodiment of the present invention described in FIGS. 1–5 includes a four port valve housing 10 having an upper valve chamber 11 and a lower valve chamber 12 provided in opposite parallel flat surfaces 10a, 10b of the valve housing 10. It appears from FIGS. 1 and 2 that the valve chambers are substantially circular in plan view, and from FIGS. 3 and 4 that they are substantially bowl or plate shaped in side view.

Figure 1:
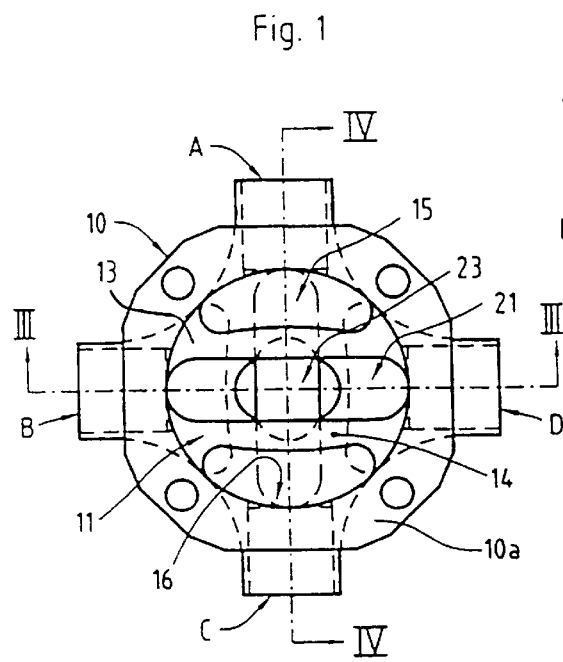
FIG. 1 is a top view of a valve housing of a first embodiment.

Extending like parallel chords across the upper valve chamber 11 are two valve seat means in the shape of weirs or thresholds 13 and 14 (FIG. 1). Interiorly provided in the valve housing 10 are well-like channels 15, 16 (see FIG. 4) that open in the valve chamber 11 radially outside the thresholds 13, 14, respectively, and communicate with respective ports A and C.

Figure 2:
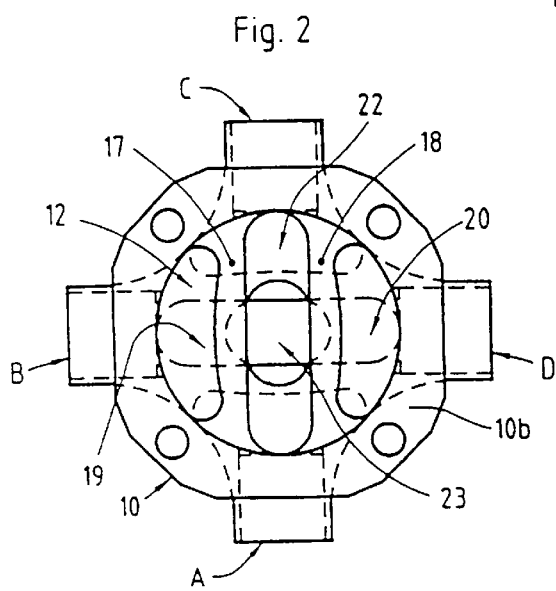
FIG. 2 is a bottom view of the valve housing according to FIG. 1.

Similarly, the lower valve chamber 12 has two parallel valve seat means in the shape of weirs or thresholds 17, 18 extending like parallel chords over the valve chamber (FIG. 2). Interiorly provided in the valve housing 10 are likewise well-like channels 19, 20 that open in the valve chamber 12 radially outside the thresholds 17, 18, respectively, and communicate with respective opposite ports B and D.

As appears from FIGS. 1 and 2, the ports A and C are mutually aligned and diametrically opposed to each other as are the ports B and D. It also appears that the common axis of the channels 15 and 16 and their associated ports A and C and the common axis of the channels 19 and 20 and their associated ports B and D are perpendicular to each other, and, further, that the mutually parallel thresholds 13, 14 associated to the channels 15, 16 are perpendicular to the mutually parallel thresholds 17, 18 associated to the channels 19, 20.

Between the thresholds 13, 14 of the upper valve chamber 11 is provided a substantially V- or funnel-shaped recess or cavity 21 (FIG. 3) tapering from substantially the diameter length of the valve chamber 11 towards the lower valve seat 12 where it opens between the thresholds 17 and 18. The width of the cavity equals the distance between the thresholds 13 and 14. Correspondingly, between the thresholds 17, 18 of the lower valve chamber 12 is provided a likewise substantially V- or funnel-shaped recess or cavity 22 (shown inverted in FIG. 4) tapering from substantially the full diameter length of the valve chamber 12 towards the upper valve seat 11 here it opens between the thresholds 13 and 14. The width of the cavity 22 equals the distance between the thresholds 17 and 18.

Together, the cavities 21 and 22 form a central space 23 extending through the valve housing 10 between the valve chambers 11 and 12 and having no communication with any of the ports A, B, C and D except across a corresponding threshold 13, 14, 17 and 18, respectively.

Figure 3:
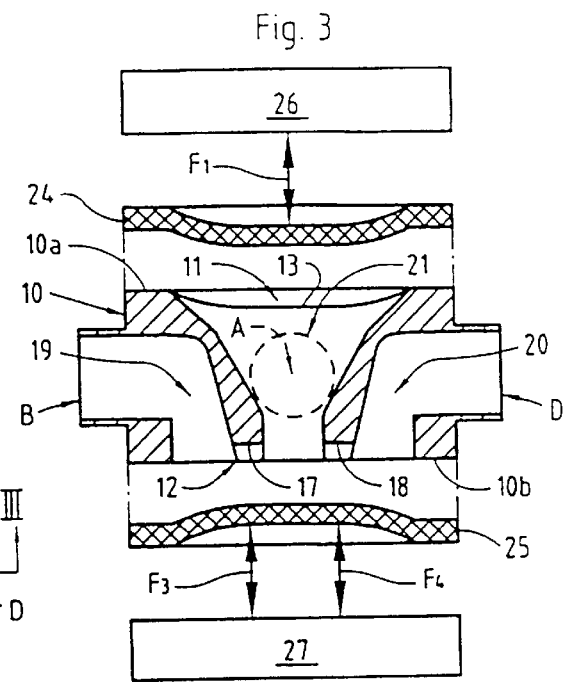
FIG. 3 is a vertical central section taken along line III—III in FIG. 1, but at a larger scale.
Figure 4:
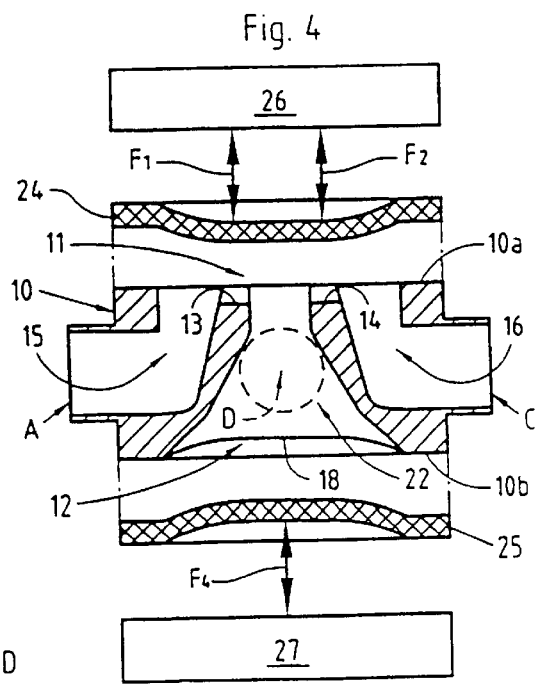
FIG. 4 is a vertical central section taken along line IV—IV in FIG. 1, at the same scale as FIG. 3.

Shown in FIGS. 3 and 4 are an upper diaphragm 24 and a lower diaphragm 25 adapted for cooperation with the thresholds 13, 14 of the upper valve chamber 11 and with the thresholds 17, 18 of the lower valve chamber 12, respectively. In order not to interfere with details of the valve housing, the diaphragms are shown spaced from the upper surface 10a and the lower surface 10b, respectively, of the valve housing 10. In operation, the diaphragms are clamped between respective upper and lower operating units 26, 27 and the upper valve housing surface 10a and the lower valve housing surface 10b, respectively. Both operating units schematically shown in FIGS. 3 and 4 are suitably of the first kind described in WO 97/17558 having two control means selectively movable in the directions indicated by arrows $F_1$, $F_2$, $F_3$ and $F_4$ to press one portion each of a diaphragm 24, 25 against a respective threshold 13, 14 and 17, 18, and to raise corresponding portions off the thresholds.

Now, by choosing different combinations of pressing and raising diaphragm portions, flow between the different ports may be established at least as appears from the following table:

| Two-way communication between ports | | | | |
|---|---|---|---|---|
| A ←→ B | C ←→ B | A + C ←→ B | A ←→ C | D ←→ B |
| $F_1$ + | $F_1$ − | $F_1$ + | $F_1$ + | $F_1$ − |
| $F_2$ − | $F_2$ + | $F_2$ + | $F_2$ + | $F_2$ − |
| $F_3$ + | $F_3$ + | $F_3$ + | $F_3$ − | $F_3$ + |
| $F_4$ − | $F_4$ − | $F_4$ − | $F_4$ − | $F_4$ + |

In the above table, $F_1$, $F_2$, $F_3$ and $F_4$ refer to the directions of movement of the control means of the operating units 26, 27, and a + sign implies a direction of movement to open flow passage across a threshold by raising a diaphragm portion off an associated threshold, whereas a − sign implies a direction of movement to shut flow passage across a threshold by pressing a diaphragm portion against an associated threshold.

The second embodiment of the present invention shown in FIGS. 5–9 includes a three-port valve housing 30 having an upper valve chamber 31 and a lower valve chamber 32 provided in opposite parallel surfaces 30a, 30b of the valve housing. It appears from FIGS. 5 and 6 that the valve chambers are substantially circular in plan view and substantially bowl or plate shaped in side view.

Extending like parallel chords across the upper valve chamber 31 are two valve seat means in the shape of weirs or thresholds 33 and 34 (FIG. 5). Interiorly provided in the valve housing 30 are well-like channels 35, 36 (see FIGS. 8 and 9) that open in the valve chamber 31 radially outside the thresholds 33, 34, respectively, and communicate with respective ports A' and C' that are mutually aligned and diametrically opposed to each other. Evidently, the arrangement of the upper valve chamber 31 with its associated thresholds, channels and ports is similar to that of the upper valve chamber 11 of the first embodiment.

The lower valve chamber 32 has but one valve seat means in the shape of a weir or threshold 37, excentrically extending like a chord over the valve chamber (FIG. 6). Interiorly provided in the valve housing 30 is a well-like channel 39 that opens in the valve chamber 32 radially outside the threshold 37 and communicates with a port D'.

It appears from FIGS. 5 and 6 that the common axis of the channels 35 and 36 and their associated ports A' and C' and the common axis of the channel 39 and its associated port D' are perpendicular to each other, and, further, that the mutually parallel thresholds 33, 34 associated to the channels 35, 36 are perpendicular to the threshold 38 associated to the channel 39.

Between the thresholds 33, 34 of the upper valve chamber 31 is provided a recess or cavity 41 (FIGS. 5 and 7)

extending through the valve housing to open in the lower valve chamber 32 on the opposite side of the threshold 38 relative to the channel 39. The width or the cavity equals the distance between the thresholds 33 and 34 (FIG. 5).

Also in the lower valve chamber 32 there is provided, on the opposite side of the threshold 38 relative to the channel 39, a recess or cavity 42 (FIGS. 6 and 7) extending through the valve housing to open in the upper valve chamber 31 between the threholds 33, 34.

Together, the cavities 41 and 42 form a central space 43 extending through the valve housing 10 between the valve chambers 11 and 12 and having no communication with any of the ports A', B', C' and D' except across a corresponding threshold 33, 34, 3 and 38, respectively.

Shown in FIGS. 7, 8 and 9 are an upper diaphragm 44 and a lower diaphragm 45 adapted for cooperation with the thresholds 33, 34 of the upper valve chamber 31 and with the threshold 38 of the lower valve chamber 32, respectively. In order not to interfere with details of the valve housing, the diaphragms are shown spaced from the upper surface 30a and the lower surface 30b, respectively, of the valve housing 30. In operation, the diaphragms are clamped between respective upper and lower operating units 46, 47 and the upper valve housing surface 30a and the lower valve housing surface 30b, respectively. Like in FIGS. 3 and 4, the upper operating unit 46 schematically shown in FIGS. 7–9 is suitably of the first kind described in WO 97/17558 having two control means selectively movable in the directions indicated by arrows $F_1$, $F_2$ to press one portion each of a diaphragm 44 against a respective threshold 33, 34, respectively, and to raise corresponding portions off the thresholds. The lower operating unit 47 schematically shown in FIGS. 7–9 is suitably of the second kind described in WO 97/17558 having only one control means selectively movable in the directions indicated by an arrow $F_5$ to press a portion of a diaphragm 45 against the threshold 38 and to raise that portion off the threshold.

Now, by choosing different combinations or pressing and raising diaphragm portions, flow between the different ports may be established at least as appears from the following table:

| Two-way communication between ports | | | |
|---|---|---|---|
| A' ←→ D' | C' ←→ D' | A' + C' ←→ D' | A' ←→ C' |
| $F_1$ + | $F_1$ − | $F_1$ + | $F_1$ + |
| $F_2$ − | $F_2$ + | $F_2$ + | $F_2$ + |
| $F_5$ + | $F_5$ + | $F_5$ + | $F_3$ − |

In the above table, $F_1$, $F_2$ and $F_5$ refer to the directions of movement of the control means of the operating units 46, 47, and a + sign implies a direction of movement to open flow passage across a threshold by raising a diaphragm portion off an associated threshold, whereas a − sign implies a direction of movement to shut flow passage across a threshold by pressing a diaphragm portion against an associated threshold.

In the above description of the first and second embodiment of the present invention, the two valve chambers are provided in opposite parallel surfaces of the valve housing. However, the principles of the present invention involve a high degree of freedom as to the location of valve chambers. It would be quite possible, thus, to arrange two or more valve chambers in flat surfaces of a valve housing that are not opposite to each other provided only there is a possibilty to provide "a central space", such as a channel, between them. Consequently, even two or more valve chambers provided in the very same surface would be quite possible.

A few examples of such possible arrangements will be briefly described with reference to FIGS. 10–19.

In FIG. 10 is shown a perspective view of an embodiment including a valve housing block 100a having a substantially square cross section. One valve chamber 101 is provided in each of the four sides of the square cross section (FIG. 11). Each valve chamber has thresholds 102, 103 and between the thresholds a cavity 104 communicating with a corresponding cavity of each other valve chamber through internal intersecting channels 105, 106. Channels 107, 108 open in each valve chamber outside the thresholds 102, 103 and communicate with respective upper and lower ports P1, P2.

FIG. 12 shows a perspective view of an embodiment having one valve chamber 101 in each of the six sides of a valve housing block 100b having the cross section of a regular hexagon. Internal, intersecting channels 109, 110, 111 (FIG. 13) extending between opposed valve chambers connect the cavities 104 of all valve chambers 101. Channels 107, 108 open in each valve chamber 101 and communicate with respective upper and lower ports P1, P2.

Figure 14:
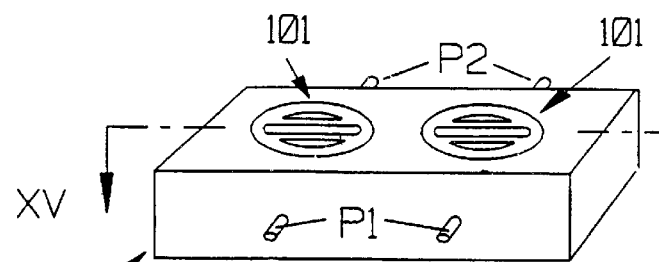
FIG. 14 is a perspective view of a possible fifth embodiment of the present invention including a valve housing having two valve chambers in one flat surface.
Figure 15:
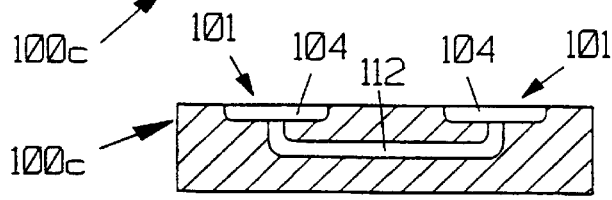
FIG. 15 is a section along line XV—XV of FIG. 14.

FIGS. 14 and 15 show a valve housing block 100c having two valve chambers 101 in an upper flat surface. An internal channel 112 connects the cavities 104 of the two valve chambers, and ports P1, P2 communicate with a respective valve chamber as before.

Figure 16:
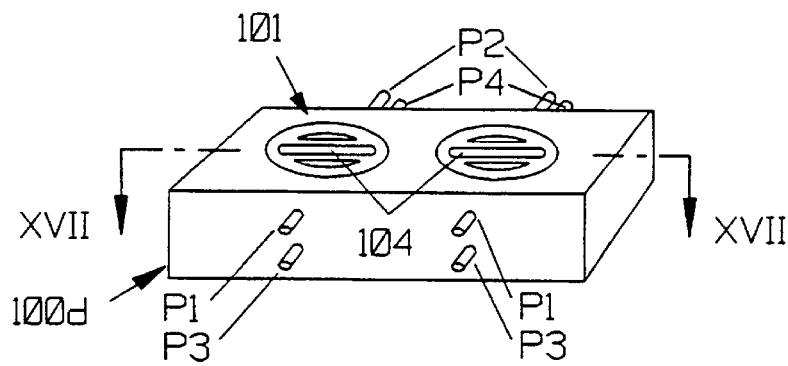
FIG. 16 is a perspective view of a possible sixth embodiment of the present invention including a vavle housing having two valve chambers in each of two opposed flat surfaces.
Figure 17:
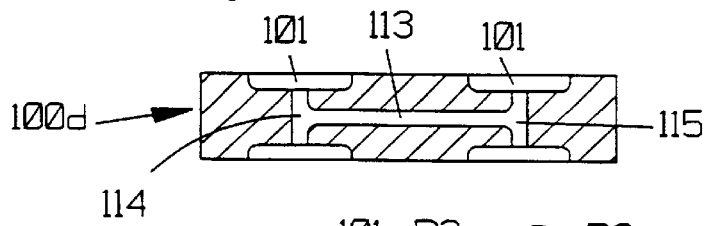
FIG. 17 is a section along line XVII—XVII of FIG. 16.

FIGS. 16 and 17 show a valve housing block 100d having two valve chambers 101 in each of two opposed flat surfaces. Three internal channels 113, 114, 115 interconnect all four valve chambers, and ports P1, P2, P3, P4 communicate with a respective valve chamber.

Figure 18:
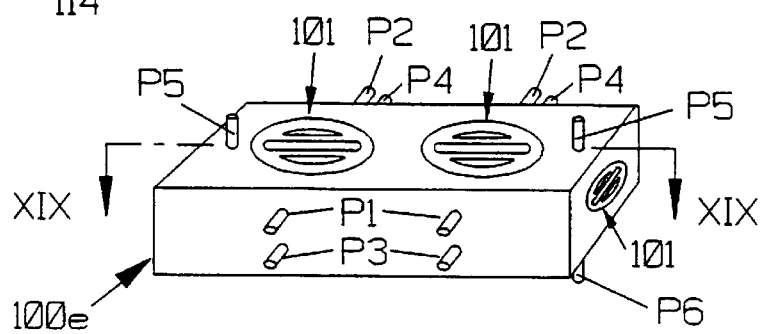
FIG. 18 is a perspective view of a seventh embodiment of the present invention including a valve housing having two valve chambers in each of two opposed flat surfaces (as in FIGS. 16 and 17) and one valve chamber in each of two opposed endsurfaces.
Figure 19:
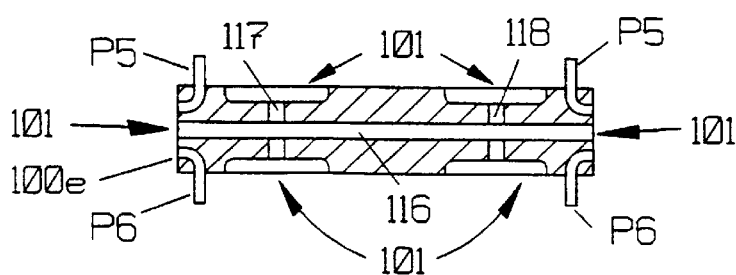
FIG. 19 is a section along line XIX—XIX of FIG. 18.

FIGS. 18 and 19 show an embodiment having a valve housing block 100e with two valve chambers 101 in each of two opposed flat surfaces and one valve chamber 101 in each of two opposed end surfaces. Three internal channels 116, 117, 118 interconnect all six valves, and ports P1, P2, P3, P4, P5, P6 communicate with a respective valve chamber.

What is claimed is:

1. A diaphragm valve including a valve housing having at least three ports and at least two valve chambers provided in the valve housing, each valve chamber having at least one first space communicating with a respective one of said ports, and a second space separated from said first space by a threshold, said second space of each valve chamber communicating with said second space of others of said at least two valve chambers by communicating with a central space of the valve housing common to all of said second spaces, communication between any two of said at least two ports taking place across two thresholds.

2. The diaphragm valve according to claim 1, wherein one valve chamber is arranged in each of two opposed surfaces of a valve housing block.

3. The diaphragm valve according to claim 1, wherein one valve housing is arranged in each of a plurality of surfaces of a valve housing block.

4. The diaphragm valve according to claim 1, wherein more than one valve chamber is arranged in at least one of a plurality of surfaces of a valve housing block.

* * * * *